Aug. 23, 1938.  H. E. DRENNAN  2,127,953
PROCESS OF TREATING HYDROCARBON OILS
Filed July 25, 1936
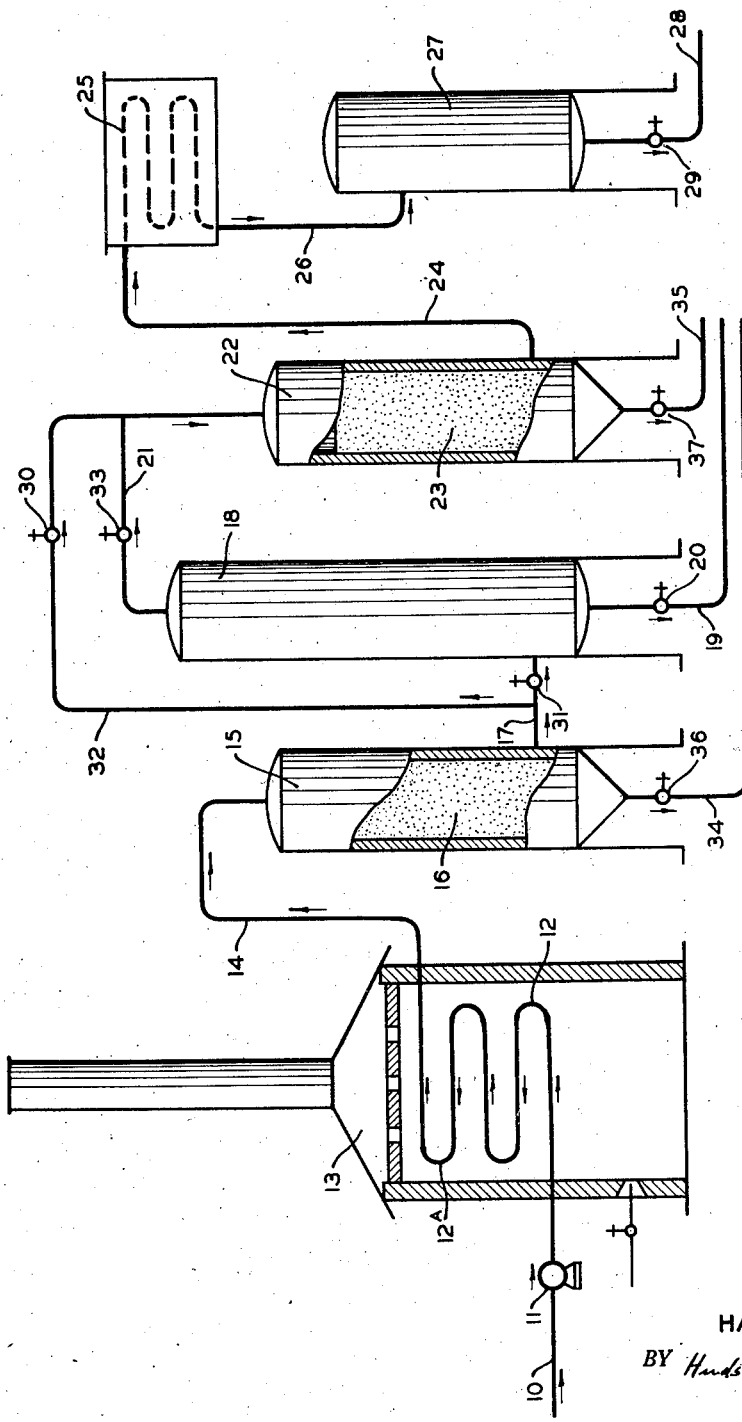
INVENTOR.
HARRY E. DRENNAN
BY Hudson, Conner and Young
ATTORNEYS.

Patented Aug. 23, 1938

2,127,953

UNITED STATES PATENT OFFICE 2,127,953

PROCESS OF TREATING HYDROCARBON OILS

Harry E. Drennan, Whittenburg, Tex., assignor to Phillips Petroleum Company, a corporation of Delaware Application July 25, 1936, Serial No. 92,631

4 Claims. (Cl. 196—52)

This invention relates to the art of treating hydrocarbons for the purpose of producing therefrom an improved type of motor fuel. In its more specific aspects, the present invention relates to the treatment of hydrocarbons of the gasoline type to convert the same into gasoline like products having high anti-knock qualities.

The object of this invention, therefore, is to treat hydrocarbons of the gasoline type to improve their qualities.

A still further object of this invention is to treat hydrocarbons of the gasoline type by contacting the same with caliche of the limestone type and thereby improve the anti-knock qualities of the same.

Briefly, by this invention it is proposed to produce gasoline like products of high quality by passing hydrocarbon oils in vapor phase, while maintained in a highly heated or superheated form, into contact with caliche which is maintained by the heat of the vapors or otherwise at a temperature above the normal vapor temperature at the existing pressure of the hydrocarbons under treatment.

The following description, which is a preferred type of operation, is offered merely for purpose of disclosing the different stages to include the various temperatures and conditions which exist and is not to be considered as limitations thereto, as the method is capable of many variations which are included within the general scope of the invention.

Fig. 1 illustrates diagrammatically one type of apparatus for effecting the present invention.

The hydrocarbon oil to be treated is introduced through pipe 10 by means of a pump 11 and forced into a heating coil 12 contained in the furnace 13 which may be heated by any suitable means. In coil 12 the oil is vaporized and heated to any desirable temperature, and the heated vapors pass from coil 12 to a continuation thereof 12A wherein the vaporized oil is superheated and from whence it passes through the pipe 14 into a catalytic treatment tower 15 in which there is contained a body of caliche, designated by the reference numeral 16. The vapors entering the tower 15 pass through the body 16 of caliche which is maintained by the heat of the vapors, or by any other suitable means, at a desired temperature. The treated vapors leave the tower 15 near the bottom thereof and flow through a pipe 17 controlled by valve 31, into a fractionating tower 18 where the product is cut to the desired end point, whether it be gasoline or tractor fuel, and which may be withdrawn through pipe 19 controlled by valve 20.

The vapors pass overhead from the fractionating tower 18 through the conduit 21 and into a second tower 22 containing a body 23 of clay through which the vapors pass. Vapors leave the clay containing tower 22 through conduit 24 and pass through a condenser 25 and then flow through conduit 26 to a tank 27 from which they are withdrawn through pipe 28, controlled by valve 29, to storage.

If the product being charged to the vaporizing coil 12 is in the boiling range desired, fractionating tower 18 may be by-passed and the vapors passed directly from the catalyst tower 15 to the clay tower 22 at the desired temperature. Wherein it is desired to by-pass the vapors around the fractionating tower 18, the valve 30 in the line 32 is opened, and valve 31 of line 17 and valve 33 of line 21 is closed.

Condensates accumulating in the towers 15 and 22 may be withdrawn from the bottoms thereof through the pipes 34 and 35 respectively, which are controlled by the valves 36 and 37.

The invention contemplates fractionating or refractionation of the hydrocarbon oils treated by the process when required. Example is given below to clarify the process but is not to be interpreted as limitations to the invention.

*Example.*—Cracked gasoline was vaporized and the vapors heated to 700° F. and passed through a tower containing calcium carbonate in the form of caliche screened to pass a 5 mesh and retained on a 30 mesh screen. The tower was maintained at about 700° F. and a pressure of approximately 15 to 20 pounds per square inch. The rate of passing the gasoline vapors through the caliche was equivalent to 3 to 5 barrels of distillate per hour per ton of catalyst. Tests on the charge and make are as follows:

|  | Charge | Make |
|---|---|---|
| Gravity, A. P. I. | 58.3 | 56.0 |
| Initial boiling point | 98° F. | 106° F. |
| 5% | 136° F. | 140° F. |
| 10% | 158° F. | 168° F. |
| 20% | 196° F. | 196° F. |
| 30% | 220° F. | 220° F. |
| 40% | 242° F. | 242° F. |
| 50% | 268° F. | 266° F. |
| 60% | 290° F. | 286° F. |
| 70% | 312° F. | 316° F. |
| 80% | 328° F. | 344° F. |
| 90% | 382° F. | 372° F. |
| End point | 410 | 430 |
| Percent recovery | 97 | 98 |
| Percent residue | 2 | 1 |
| Percent loss | 1 | 1 |
| Percent over at 212° F | 27 | 27 |
| R. V. P. (Reid vapor pressure) | 9.4 | 5.5 |
| Percent sulphur | .136 | .105 |
| Octane No | 61 | 63.8 |
| T. E. L. to 70 Octane No., cc. per gallon | 2.1 | .90 |
| Percent reduction T. E. L. (tetraethyl lead) |  | 57 |

In practicing this invention the temperature may range from 500° to 1,500° F. and the pressure may vary from atmospheric to 5,000 pounds. But when treating lighter hydrocarbons, such as butane and methane, in accordance with this invention the pressure may vary from atmospheric to 5,000 pounds and the temperature from 800° to 1,500° F.

In the practice of this invention it is to be understood that nothing herein stated relative to the description thereof is intended to restrict the type of hydrocarbon of the motor fuel or gasoline range or type that may be treated in accordance with the teachings of this present invention, and accordingly hydrocarbons of the gasoline type or within the gasoline or motor fuel range, derived from distillation, cracking, polymerization, or by any other manner and from any source, may be treated by the method herein described.

I claim:

1. The method of increasing the anti-knock qualities of hydrocarbons boiling within the gasoline range which comprises passing said hydrocarbons while in the vapor phase and at a temperature within the range 500° to 1,500° F., over a body of caliche of the limestone type at a flow rate sufficient that only a minimum of cracking occurs.

2. The method of increasing the anti-knock qualities of hydrocarbon motor fuels boiling within the gasoline range which comprises passing said hydrocarbons while in the vapor phase and at a temperature within the range of 500° to 1,200° F. in contact with a body of caliche of the limestone type at a flow rate so regulated that the boiling range of the treated product is not materially altered.

3. The method of improving the quality of hydrocarbon motor fuels boiling within the gasoline range which comprises contacting said hydrocarbons in the vapor phase at a temperature within the range 500° to 1,200° F. with a body of caliche of the limestone type at a flow rate so regulated that only a minimum of cracking occurs thereby producing a motor fuel of improved quality.

4. The method of increasing the quality of motor fuels boiling within the gasoline range which comprises vaporizing said fuels, heating the vapors to a temperature within the range 500° to 1,200° F., contacting the vapors while at said temperature with a body of caliche of the limestone type at a flow rate sufficient that the boiling range of the product is not materially different from that of the charge.

HARRY E. DRENNAN.